United States Patent [19]

West

[11] 4,044,554
[45] Aug. 30, 1977

[54] GAS TURBINE ENGINE FUEL CONTROL

[75] Inventor: Gene A. West, Kokomo, Ind.

[73] Assignee: General Motors Corporation, Detroit, Mich.

[21] Appl. No.: 706,512

[22] Filed: July 19, 1976

[51] Int. Cl.² .............................................. F02C 9/08
[52] U.S. Cl. .............................. 60/39.28 T; 60/39.14; 60/39.28 R
[58] Field of Search ................... 60/39.28 T, 39.28 R, 60/39.14, 223, 39.16

[56] References Cited

U.S. PATENT DOCUMENTS

| 3,295,316 | 1/1967 | Beatrice | 60/39.28 R |
|---|---|---|---|
| 3,295,317 | 1/1967 | Blackaby | 60/39.28 R |
| 3,421,317 | 1/1969 | Bedford | 60/39.28 R |
| 3,893,291 | 7/1975 | Davis | 60/39.28 T |
| 3,938,321 | 2/1976 | Davis | 60/39.28 R |
| 4,006,590 | 2/1977 | Itoh | 60/39.28 T |

*Primary Examiner*—Clarence R. Gordon
*Attorney, Agent, or Firm*—Warren D. Hill

[57] ABSTRACT

An electronic circuit is used to control a gas turbine engine primarily as a function of turbine inlet temperature and compressor speed and in particular includes a speed governing loop to control compressor speed according to throttle position and modified by a temperature limiting compensation loop which accurately sets the turbine inlet temperature limit according to a schedule which avoids engine surge and destructive temperatures. The compensation loop is particularly designed to provide quick response to acceleration demands and a smooth transition to temperature limiting. A start fuel schedule circuit is also used to moderate the speed loop during engine starting.

4 Claims, 5 Drawing Figures

GAS TURBINE ENGINE FUEL CONTROL

This invention relates to a fuel control for gas turbine engines and particularly to an electronic circuit for such a control.

As shown in U.S. Pat. No. 3,237,404 to Flanigan et al, it has been proposed to provide a gas turbine engine with power transfer between turbine to permit operation of the engine at very high temperatures even during part load to promote engine efficiency. To optimize the capabilities of such an engine, it is desirable to control the fuel to the engine so as to obtain quick response to acceleration requests without sacrificing smooth stable operation and to operate at efficient high temperatures particularly during engine acceleration without attaining temperatures which are destructive to turbine blades or cause engine surge.

It is therefore an object of this invention to provide a fuel control circuit for a gas turbine engine which provides fast response to acceleration requests combined with temperature limiting and smooth stable operation.

It is a further object to provide in such a fuel control a fuel start schedule which cooperates with a temperature limiting schedule for smooth transition upon engine starting.

This invention is carried out by providing an electronic circuit for metering fuel to an engine having a speed governing circuit controlled by a throttle signal and a compensation loop particularly effective during engine acceleration to detect rapid increases in the speed governing signal and generate a feedback signal for subtraction from the speed governing signal values sufficient to prevent temperature overshoot while allowing a rapid temperature increase and causing a smooth transition to a temperature limiting mode, and a temperature limiting circuit for effecting changes in the compensation loop feedback signal to maintain the fuel control signal below that which would cause excessive temperatures. The invention further contemplates a fuel start circuit which modifies the speed governing signal to obtain a predetermined fuel schedule upon starting and for smoothly transferring to the temperature limiting control.

The above and other advantages will be made more apparent from the following specification taken in conjunction with the accompanying drawings wherein like reference numerals refer to like parts and wherein.

Figure 1:
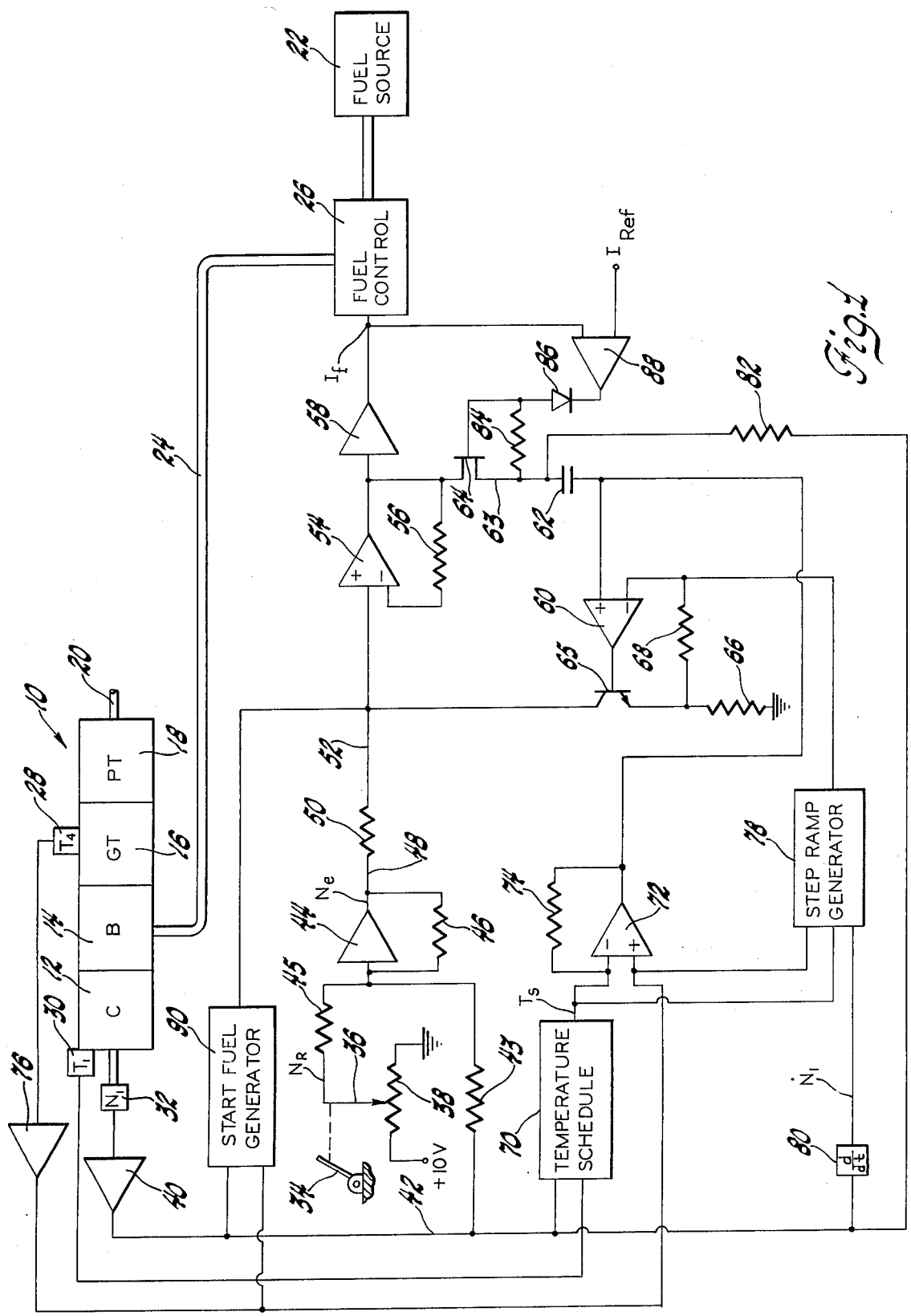
FIG. 1 is a circuit diagram of a fuel control according to the invention.

The system illustrated schematically in FIG. 1 comprises a gas turbine engine 10 of the gas-coupled type including a compressor 12 which draws in atmospheric air and delivers it at higher pressure, a burner or combustion apparatus 14 which receives the discharge from the compressor and a gas generator turbine 16 which is driven by the combustion products from the burner 14 and which is connected to drive the compressor 12. These elements constitute a gas generator which delivers partly expanded combustion products to a power turbine 18 which drives a power output shaft 20. An engine of this type is useful for driving automotive vehicles or boats, among other applications. Fuel for the engine is delivered from any suitable source 22 through a fuel line 24 and a fuel control 26 to the burner where it is ignited. The control meters the fuel supplied to the engine. The fuel control 26 is a type which responds to the magnitude of an electronic signal from a control circuit. Such a fuel control is shown in the U.S. Pat. No. 3,853,142 issued to R. Grundman.

The control circuit determines the desired fuel flow on the basis of turbine inlet temperature $T_4$ measured by a temperature transducer 28, ambient temperature $T_1$ measured by temperature transducer 30 at the engine inlet and compressor speed $N_1$ measured by the speed transducer 32 driven by the compressor 12. A manual control input is provided by a throttle 34 connected to the wiper 36 of a potentiometer 38 connected between a voltage source and ground thereby providing on the wiper 36 a speed reference signal $N_R$ representing desired engine speed. The actual engine speed $N_1$ from transducer 32 is supplied through an amplifier 40 and line 42 through a resistor 43 to the input terminal of an operational amplifier 44 which is also connected through a resistor 45 to the wiper 36. A feedback resistor 46 extends between the output and the input terminals so that the amplifier serves as a summer to differentially combine the throttle signal $N_R$ and the actual speed signal $N_1$ to produce on line 48 a speed error signal $N_e$. Line 48 is connected through resistor 50 to line 52 which is connected to the positive input terminal of an operational amplifier 54 which has a feedback resistor 56 between its output and its negative input terminal to serve as a buffer amplifier of unity gain. The output of the amplifier 54 is fed to an output amplifier 58 which supplies a fuel control signal $I_f$ to the fuel control 26.

A compensation loop includes an operational amplifier 60 having its positive input terminal connected through a capacitor 62 and an FET switch 64 to the output of the buffer amplifier 54. The output of amplifier 60 is connected to the base of an NPN transistor 65 having its emitter grounded through a resistor 66 and connected through a feedback resistor 68 to the negative input terminal. The collector of transistor 65 is connected to the positive input of the buffer amplifier 54 which input serves as a summing point.

A temperature schedule circuit 70 is responsive to the turbine speed signal $N_1$ on line 42 and the ambient temperature signal $T_1$ from transducer 30 to generate a signal $T_s$ representing the allowable maximum temperature as a function of ambient temperature and compressor speed. Circuits for generating such a signal are shown in the U.S. Pat. Nos. to Davis et al 3,851,464 and Oppmann 3,834,158. In the subject control, the desired temperature schedule is 1650° F at compressor speeds below 46% of maximum speed and at higher speeds the temperature ranges between 1500° F and 2000° F depending upon the ambient temperature $T_1$. The specific temperature characteristics are selected on the basis of the temperatures required to prevent surge which in turn is a characteristic of a given engine design. The output $T_s$ of the temperature schedule circuit 70 is supplied to the negative input terminal of summing amplifier 72 which has a feedback resistor 74 between its output and the negative input. The turbine inlet temperature $T_4$ from the transducer 28 is fed through an amplifier 76 to the positive input terminal of the amplifier 72 where it is differentially combined with the temperature schedule signal $T_s$. The output of the amplifier 72 is connected to the positive input of the amplifier 60.

A step ramp generator 78 has inputs connected through a differentiator 80 to the $N_1$ signal to provide an $\dot{N}_1$ input to the generator 78. Other inputs to the step ramp generator are the temperature schedule signal $T_s$ from the circuit 70 and the turbine inlet temperature signal $T_4$. The generator 78 combines those inputs to provide an output signal representing the value $T_s - T_4 - 250°$ F $+ \dot{N}_1$. That signal is fed to the negative input of the amplifier 60.

The $N_1$ signal is connected through a resistor 82 to the line 63 between the FET 64 and the capacitor 62. The gate of the FET is connected through a resistor 84 to the line 63 and is also connected through a diode 86 to the output of an operational amplifier 88 operating as a comparator for comparing input signals which include the fuel control signal $I_f$ at the output of amplifier 58 and a reference signal $I_{Ref}$ representing 0.25 amps (indicative of fuel nearly off) and is arranged such that the FET 64 is switched to its conductive state when the value of $I_f$ exceeds $I_{Ref}$.

In operation, when the engine 10 is in a substantially steady state mode, the position of the throttle 34 sets the engine speed. The amplifier 44 compares the speed reference signal $N_R$ and the $N_1$ signal from line 42 to produce a speed error signal $N_e$ on line 48. That signal is normally transmitted through the buffer amplifier 54 to the output amplifier 58 and the fuel control 26 so that as the speed $N_1$ varies from that speed selected by the throttle, the fuel flow will be appropriately changed to reduce the speed error. In the event of a sudden increase of the speed reference signal $N_R$ by the throttle to call for high engine acceleration, the speed error $N_e$ will rapidly increase to a large value. That increase, if unchecked, would produce a maximum fuel flow resulting in very high temperature, possible engine surge, and control instability. However, the compensation loop including the amplifier 60 attempts to moderate the sudden increase of the speed error signal $N_e$. When the sudden signal increase initially is reflected in the output of the amplifer 54, it is differentiated by the capacitor 62 and amplifier 60 to sharply turn on the transistor 65 to sink current from the line 52 thereby compensating for the rapidly increasing speed error signal $N_e$. It is desirable, however, for a controlled portion of the rapid increase to pass through to the fuel control in order to obtain fast response to the acceleration request. The output signal of the step ramp generator 78 applied to the negative input terminal of the operational amplifier 60 offsets a portion of the differentiated signal thereby initially diminishing the compensation signal through transistor 65. Thus in effect, the step ramp generator 78 determines the amount of the step speed error signal $N_e$ which can pass through to the fuel control, that value being determined according to the formula $T_s - T_4 - 250°$ F $+ \dot{N}_1$. Thus where the temperature $T_4$ is very low, the allowed step is very large. After the initial signal increase has passed, the compensation signal is gradually reduced by virtue of the step ramp generator signal which is integrated by the circuit including the operational amplifier 60, the transistor 65 and the feedback circuit including the amplifier 64 and the capacitor 62. Thus the rate of decrease of the compensation signal is determined by the difference between the $T_s$ and $T_4$ as well as the value of $\dot{N}_1$. Where the turbine is accelerating rapidly or the temperature difference is great the rate of decrease of the compensation signal will be large so that the rate of increase of $I_f$ is correspondingly large.

Figure 2:
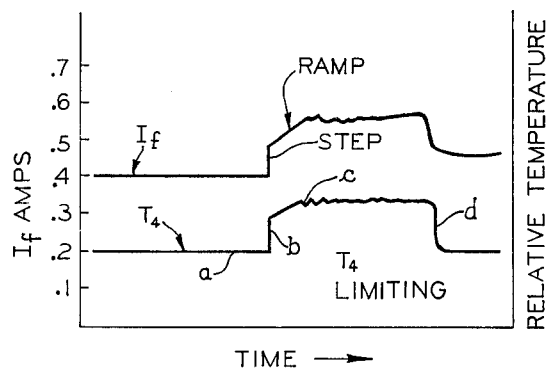
FIG. 2 is a graphical representation of engine temperature and fuel control current during engine acceleration from a speed governing condition.

The curves of FIG. 2 depict the values of fuel control current $I_f$ and turbine inlet temperature $T_4$ which occur when a step throttle increase occurs during a speed governing mode. Since $T_4$ is generated as a function of $I_f$, the two curves are similar in shape. During period $a$, the fuel flow and temperature are determined by speed governing, i.e. the fuel control is by the main loop of the control circuit so that the speed $N_1$ and the speed reference signal $N_R$ on wiper 36 are equal. At point $b$ the throttle is quickly advanced to call for engine acceleration and the speed error signal $N_3$ on line 48 reaches its maximum value. The compensation loop prevents the full step signal from passing through to the fuel control 26. The step ramp generator 78 sets the amplitude of the step signal which may be passed and then establishes a ramp signal having a slope dependent upon $N_1$ and the difference between $T_4$ and $T_s$. A large value of $\dot{N}_1$ results in a steeper ramp. The ramp continues until point $c$ when temperature limiting takes place, that is $T_4$ exceeds $T_s$ and the resultant output of the comparator 72 is integrated via amplifier 60 and capacitor 62 to control the current flow through the transistor 65 such that the fuel flow is kept down to a value which maintains $T_4$ substantially equal to $T_s$. At point $d$, the engine speed has increased to the value called for by the throttle so that $N_e$ becomes small and the fuel control then is again a function of speed governing.

Figure 3:
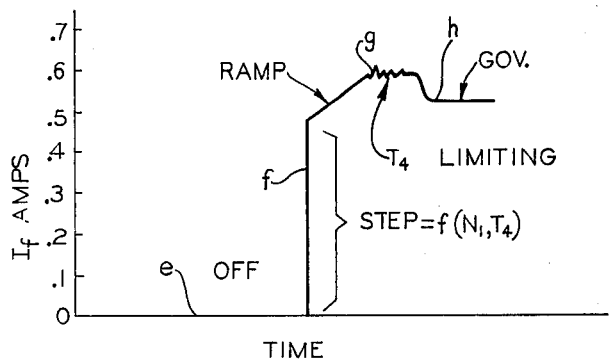
FIG. 3 is a graphical representation of fuel control current during engine acceleration from a fuel off condition.

The $I_f$ curve shown in FIG. 3 illustrates the result of requesting engine acceleration from a fuel off condition such as occurs when the engine is being driven by vehicle wheels so that the fuel is shut off even though $N_1$ has a high value. At point $e$, $I_f$ is zero. The input $I_{Ref}$ to amplifier 88 is set at 0.25 amps such that when the control current $I_f$ is below that value, the FET 64 is switched off. Then the capacitor 62 is charged through resistor 82 to a value dependent upon $N_1$. Thus at point $f$ when a step increase in $N_e$ occurs due to throttle advancement, that step signal tends to pass to the fuel control 26 causing the FET to turn on. The compensating loop then will become effective to limit the amplitude of the step change in $I_f$, however, the step amplitude is determined not only by the step ramp generator as before but also by the charge on the capacitor 62. Thus the step is a large one to supply adequate fuel to obtain light-off and quickly bring the engine temperature to a value near the limiting temperature. Then, as explained previously, a ramp signal controlled by generator 78 provides a smooth transition from the step to the $T_4$ limiting range occurring at $g$. Finally, when the turbine speed closely approaches its desired value, speed governing occurs again at point $h$.

Figure 4:
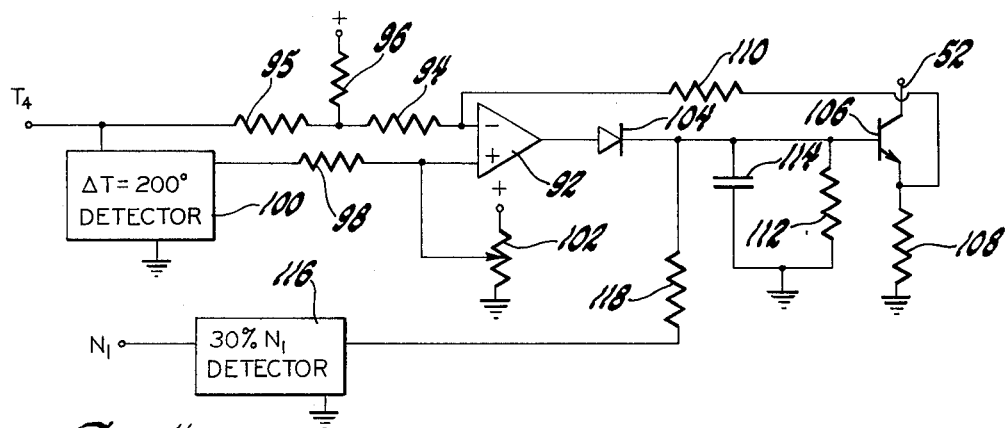
FIG. 4 is a circuit diagram of the start fuel generator of FIG. 1.

A specialized mode of operation of the engine occurs during starting. FIG. 1 includes a start fuel generator 90 having $T_4$ and $N_1$ signal inputs and an output connected to the summing junction at the positive input terminal of the operational amplifier 54. As shown in FIG. 4, the start fuel generator 90 includes an operational amplifier 92 having its negative input terminal connected through resistors 94 and 95 to the $T_4$ signal and also connected through the resistor 94 and a resistor 96 to a positive voltage supply. The positive input terminal is connected through a resistor 98 to a circuit 100 which connects the resistor 98 to ground whenever a change of 200° F occurs in the temperature $T_4$. The positive input terminal is also connected to the wiper of a potentiometer 102 which is connected between positive voltage and ground. The output of amplifier 92 is connected through a diode 104 to the base of a transistor 106 having its collector connected to the summing point or line 52 of the circuit of FIG. 1. The transistor emitter is connected through a resistor 108 to ground and also connected through a feedback resistor 110 to the negative input of amplifier 92. The base of the transistor 106 is connected to ground through the parallel combination of a resistor 112 and capacitor 114. A 30% $N_1$ detector 116 has as its input the $N_1$ signal and provides a grounded output signal whenever the speed $N_1$ attains 30% of its maximum design value. The output is connected through a resistor 118 to the base of the transistor 106.

In operation the circuit initially during starting is responsive primarily to the potentiometer 102 to provide an output signal through diode 104 turning on the transistor 106 to provide a sink current sufficient to establish $I_f$ at 0.38 amps. Changes in $T_4$ and manual operation of potentiometer 102 provide minor adjustments to the starting fuel. When engine light-off occurs the $\Delta T$ detector 100 effectively ground the positive input of the amplifier 92 so that no signal passes through the diode 104. The capacitor 114 then discharges through the resistor 112 to slowly turn off the transistor 106 thereby causing an increase in the current $I_f$. When turbine speed reaches 30% of its maximum value, the detector 116 ground the base of transistor 106 to inhibit any further action of the start fuel generator 90.

Figure 5:
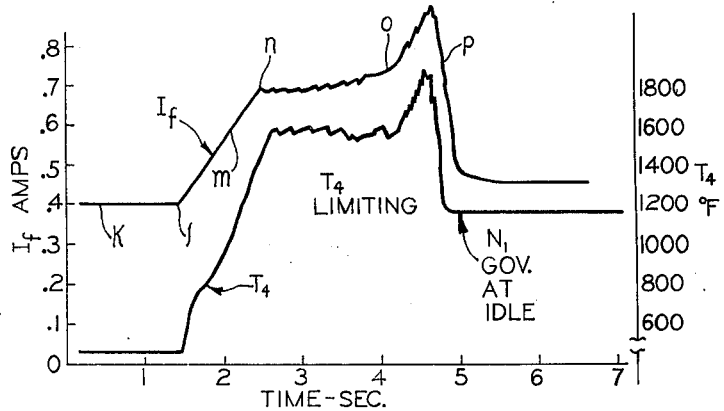
FIG. 5 is a graphical representation of engine temperature and fuel control current during engine starting.

A curve depicting $I_f$ and $T_4$ during starting is shown in FIG. 5. $N_e$ is at maximum value since $N_1$ is zero and the throttle signal $N_R$ is at idle or greater. The start fuel generator 90 acts to sink the signal on line 52 to obtain approximately 0.38 amps $I_f$ which provides an appropriate amount of fuel to obtain light-off. This condition is shown in region $k$ of FIG. 5 where $T_4$ is at ambient temperature. At point $l$ light-off occurs as shown by the rapid increase of $T_4$. When an increase of 200° F occurs, the start fuel generator sinks progressively less of the signal on line 52 to provide a gradually increasing value of $I_f$ as shown in region $m$. The consequent increase of fuel flow causes a corresponding rise of $T_4$ until temperature limiting occurs at point $n$. The temperature schedule circuit 70 is set for 1650° F at speeds below 46% $N_1$. That condition prevails so that temperature limiting occurs as the turbine continues to accelerate. When 46% of maximum engine speed is attained, the temperature schedule changes to a new value at point $o$ so that the temperature and the fuel flow is allowed to increase to a new level. Finally at $p$ speed governing begins to assume dominance as the engine speed approaches that requested by the throttle. The start fuel generator is disabled when $N_1$ attains 30% of maximum turbine speed.

It will thus be seen that the control circuit according to the invention provides a unique arrangement for controlling turbine operation with high accuracy and for obtaining fast smooth response to acceleration requests while preventing engine surge or temperatures high enough to damage engine components.

The embodiments of the invention in which an exclusive property or privilege is claimed are defined as follows:

1. In a fuel control system for a gas turbine engine having means for generating a turbine inlet temperature signal, means for generating a turbine speed signal, and means for controlling fuel flow to the engine in response to a fuel control signal; means for producing said fuel control signal comprising a speed governing circuit having a throttle signal input requesting a certain turbine speed, means comparing the throttle signal with the turbine speed signal to produce a speed error signal, a compensation loop having a differentiating circuit responsive to a rapid increase in the speed error signal for subtracting a variable compensation signal from the speed error signal to produce the fuel control signal which therefore is constrained in its rate of increase, the compensation loop including a step ramp generator programmed according to the temperature signal for offsetting at least a portion of the compensation signal to limit the response of the compensation signal to high change rates of the speed error signal, thereby allowing moderate increases in the speed error signal to be immediately reflected in the fuel control signal, the step ramp generator further gradually decreasing the compensation signal to allow an increasing fuel control signal following the rapid increase in the speed error signal, and engine temperature limiting means including means for establishing an engine temperature limit schedule to provide a schedule signal, comparator means for comparing the turbine temperature signal and the schedule signal to produce a temperature error signal, the compensation loop including integrator means responsive to the temperature error signal to vary the compensation signal to reduce the fuel control signal when turbine temperature exceeds the temperature schedule.

2. In a fuel control system for a gas turbine engine having means for generating a turbine inlet temperature signal, means for generating a turbine speed signal, and means for controlling fuel flow to the engine in response to a fuel control signal; means for producing said fuel control signal comprising a speed governing circuit having a throttle signal input requesting a certain turbine speed, means comparing the throttle signal with the turbine speed signal to produce a speed error signal, a compensation loop having a differentiating circuit responsive to a rapid increase in the speed error signal for subtracting a variable compensation signal from the speed error signal to produce the fuel control signal which therefore is constrained in its rate of increase, the compensation loop including a step ramp generator programmed according to the temperature signal for offsetting at least a portion of the compensation signal to limit the response of the compensation signal to high change rates of the speed error signal, thereby allowing moderate increases in the speed error signal to be immediately reflected in the fuel control signal, the step ramp generator further gradually decreasing the compensation signal to allow an increasing fuel control signal following the rapid increase in the speed error signal, a start fuel generator for generating a start signal which is subtracted from the speed error during engine starting including means to generate an initial maximum start signal value until light-off occurs, means responsive to the temperature signal to detect light-off and to reduce the start signal to cause a controlled increase of the fuel control signal, and engine temperature limiting means including means for establishing an engine temperature limit schedule to provide a schedule signal, comparator means for comparing the turbine temperature signal and the schedule signal to produce a temperature error signal, the compensation loop including integrator means responsive to the temperature error signal to vary the compensation signal to reduce the fuel control signal when turbine temperature exceeds the temperature schedule, the temperature limit being changed from a start value to a run value when the turbine speed reaches a predetermined minimum, whereby during start up the temperature limiting means controls the engine temperature first to one value and then to another value as turbine speed increases.

3. In a fuel control system for a gas turbine engine having means for generating a turbine inlet temperature signal, means for generating a turbine speed signal, and means for controlling fuel flow to the engine in response to a fuel control signal; means for producing said fuel control signal comprising means responsive to the turbine speed signal for generating a turbine acceleration signal, a speed governing circuit having a throttle signal input requesting a certain turbine speed, means comparing the throttle signal with the turbine speed signal to produce a speed error signal, engine temperature limiting means including means for establishing an engine temperature limit schedule to provide a temperature schedule signal, a compensation loop responsive to a rapid increase in the speed error signal for subtracting a variable compensation signal from the speed error signal to produce the fuel control signal which therefore is constrained in its rate of increase, the compensation loop including a step ramp generator progammed according to engine operating parameters including the turbine acceleration signal and the difference between the temperature signal and the temperature schedule signal for offsetting at least a portion of the compensation signal to limit the response of the compensation signal to high change rates of the speed error signal, thereby allowing moderate increases in the speed error signal to be immediately reflected in the fuel control signal, the compensation loop further having integration means responsive to the said operating parameters as inputs thereof for gradually decreasing the compensation signal to allow an increasing fuel control signal following the rapid increase in the speed error signal, and comparator means for comparing the turbine temperature signal and the schedule signal to produce a temperature error signal, said integrator means responsive to the temperature error signal to vary the compensation signal to reduce the fuel control signal when turbine temperature exceeds the temperature schedule.

4. In a fuel control system for a gas turbine engine having means for generating a turbine inlet temperature signal, means for generating a turbine speed signal, and means for controlling fuel flow to the engine in response to a fuel control signal; means for producing said fuel control signal comprising a speed governing circuit having a throttle signal input requesting a certain turbine speed, means comparing the throttle signal with the turbine speed signal to produce a speed error signal, a compensation loop comprising a buffer amplifier, the input thereof forming a first summing junction and the output producing the fuel control signal, operational amplifier means having inputs forming a second summing junction and an output producing a variable compensation signal, a capacitor serially connecting the buffer amplifier output to the second summing junction, and means for subtractively connecting the operational amplifier output to the first summing junction so that the loop operates as a differentiator to signals introduced at the first summing junction and as an integrator to signals introduced at the second summing junction, means for applying the speed error signal to the first summing junction, the compensation loop being responsive to rapid increase in the speed error signal for generating the variable compensation signal for subtraction from the speed error signal to limit the rate of increase of the fuel control signal, a step ramp generator for applying a programmed signal to the second summing junction in opposition to the differential signal for offsetting at least a portion of the differentiated signal to limit the effective response of the compensation signal to high change rates of the speed error signal, thereby allowing moderate increases in the speed error signal to be immediately reflected in the fuel control signal, the programmed signal from the step ramp generator being integrated by the compensation loop to gradually decrease the compensation signal to effect an increase of the fuel control signal after rapid increase in the speed error signal, an engine temperature limiting means including means for establishing a programmed temperature reference signal and means for comparing the turbine temperature signal and the reference signal to produce a temperature error signal when engine temperature exceeds the reference value, and means for feeding the temperature error signal to the second summing junction whereby the temperature error signal is integrated to increase the compensation signal and reduce the fuel control signal.

* * * * *

UNITED STATES PATENT AND TRADEMARK OFFICE
CERTIFICATE OF CORRECTION

PATENT NO. : 4,044,554
DATED : August 30, 1977
INVENTOR(S) : Gene A. West

It is certified that error appears in the above-identified patent and that said Letters Patent are hereby corrected as shown below:

Column 4, line 14, "$N_3$" should read -- $N_e$ --.

Column 6, line 64, after "error" insert -- signal --.

Column 8, line 36, "differential" should read -- differentiated --.

Signed and Sealed this

Twenty-eighth Day of March 1978

[SEAL]

Attest:

RUTH C. MASON
*Attesting Officer*

LUTRELLE F. PARKER
*Acting Commissioner of Patents and Trademarks*